United States Patent
Anderson et al.

(10) Patent No.: US 11,803,317 B2
(45) Date of Patent: Oct. 31, 2023

(54) INTERRUPTED REPLICATED WRITE RECOGNITION

(71) Applicant: International Business Machines Corporation, Armonk, NY (US)

(72) Inventors: Owen T. Anderson, Bellevue, WA (US); Felipe Knop, Lagrangeville, NY (US); Enci Zhong, Poughkeepsie, NY (US); Frank Schmuck, Campbell, CA (US); Deepavali M. Bhagwat, Cupertino, CA (US); Hai Zhong Zhou, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 206 days.

(21) Appl. No.: 17/121,799

(22) Filed: Dec. 15, 2020

(65) Prior Publication Data

US 2022/0187990 A1 Jun. 16, 2022

(51) Int. Cl.
*G06F 3/06* (2006.01)

(52) U.S. Cl.
CPC .............. *G06F 3/065* (2013.01); *G06F 3/064* (2013.01); *G06F 3/0611* (2013.01); *G06F 3/0683* (2013.01)

(58) Field of Classification Search
CPC ...... G06F 3/065; G06F 3/0643; G06F 3/0611; G06F 3/064; G06F 3/0689;

(Continued)

(56) References Cited

U.S. PATENT DOCUMENTS

| 7,054,887 B2 | 5/2006 | Kozina |
| 8,856,590 B2 | 10/2014 | Grieco |

(Continued)

FOREIGN PATENT DOCUMENTS

EP 1543420 B1 6/2005

OTHER PUBLICATIONS

Schmuck et al., "GPFS: A Shared-Disk File System for Large Computing Clusters", printed on Sep. 2, 2020, 15 pages.

(Continued)

*Primary Examiner* — Yaima Rigol
*Assistant Examiner* — Edward Waddy, Jr.
(74) *Attorney, Agent, or Firm* — Stephen R. Yoder; Aaron N. Pontikos; Jared L. Montanaro

(57) ABSTRACT

A method for executing operation requests includes formatting one or more storage devices and selecting one or more labeled replicas and one or more distinguished replicas, receiving an operation request with respect to a set of data blocks, identifying a preferred replica corresponding to the received operation request, determining whether the replication-pending bits for the preferred replica are set, and executing the received operation request with respect to the corresponding distinguished replica. A method for executing a write operation request additionally includes setting replication-pending bits with respect to the labeled replica, wherein the replication-pending bits indicate an incomplete write request, writing data to both a labeled replica and a distinguished replica, and clearing the replication-pending bits with respect to the labeled replica to indicate the completion of the write operation. A method for executing a read operation additionally includes identifying a preferred replica with respect to the received read request.

22 Claims, 6 Drawing Sheets

(58) Field of Classification Search
CPC .... G06F 11/1451; G06F 3/0683; G06F 3/061; G06F 11/1461; G06F 3/0679
USPC ....... 711/162, 161, 114, 103, 156, 144, 145, 711/143, 12.001, 12.008, 154
See application file for complete search history.

(56) References Cited

U.S. PATENT DOCUMENTS

| | | | |
|---|---|---|---|
| 9,317,372 B1 | 4/2016 | Rousseau | |
| 9,460,126 B1 | 10/2016 | Engers | |
| 9,582,371 B1 | 2/2017 | Spyker | |
| 9,602,424 B1* | 3/2017 | Vincent | H04L 47/70 |
| 9,633,038 B2 | 4/2017 | Beard | |
| 2004/0098547 A1* | 5/2004 | Ofek | G06F 11/1451 711/170 |
| 2004/0260973 A1* | 12/2004 | Michelman | G06F 11/1464 714/13 |
| 2008/0162846 A1* | 7/2008 | Kodama | G06F 11/1451 711/162 |
| 2009/0025091 A1* | 1/2009 | Koike | G06F 21/74 726/28 |
| 2015/0193312 A1* | 7/2015 | Nanivadekar | G06F 11/1458 707/654 |
| 2017/0235645 A1* | 8/2017 | Theimer | G06F 21/6218 707/634 |
| 2019/0324865 A1 | 10/2019 | Weissman | |

OTHER PUBLICATIONS

Volobuev, Yuri, "Data and Metadata Replication in Spectrum Scale/GPFS", Spectrum Scale Development, Ver 1.0, Oct. 16, 2020, 14 pages.

Wikipedia, "Paxos (computer science)", This page last last edited on Aug. 30, 2020, 16 pages, <https://en.wikipedia.org/wiki/Paxos_(computer_science)>.

Wikipedia, "Write Anywhere File Layout", This page was last edited on Aug. 12, 2020, 5 pages, <https://en.wikipedia.org/wiki/Write_Anywhere_File_Layout>.

Xu et al., "C2: Adaptive Load Balancing for Metadata Server Cluster in Cloud-scale File Systems", printed on Sep. 2, 2020, Data Storage Institute, A*STAR, Singapore, Nanyang Technological University, 15 pages.

* cited by examiner

INTERRUPTED REPLICATED WRITE RECOGNITION

BACKGROUND

The present invention relates generally to the field of data storage, and more specifically to replication methods.

Replication in computing involves sharing information in a manner which ensures consistency between similar resources, such as software or hardware components, to improve reliability, fault-tolerance, or accessibility. Replication is a simple, widely-used method to improve data storage. Multiplicity within replication scenarios can improve durability, availability, and performance. Maintaining accuracy in the face of write failures can present challenges to existing replication solutions. Replication processes can be categorized as either passive or active. Active replication occurs when a same request is processed at every replica within a system. Passive replication occurs when all requests are processed by a single replica, and the result is then transferred to the other replicas within a system. There are three widely cited models for data replication. Transactional replication is used for replicating transactional data, such as a database. State machine replication assumes that the replicated process is a deterministic finite automation, and that atomic broadcast of every event is possible. Virtual synchrony involves a group of processes which cooperate to replicate in-memory data to coordinate actions.

SUMMARY

As disclosed herein, a computer implemented method for executing operation requests within a data storage system includes formatting one or more storage devices and selecting one or more labeled replicas and one or more distinguished replicas, receiving an operation request with respect to a set of data blocks within the one or more formatted storage devices, identifying a preferred replica corresponding to the received operation request, determining whether the replication-pending bits for the preferred replica are set, and responsive to determining that the replication-pending bits for the preferred replica are set, executing the received operation request with respect to the corresponding distinguished replica. A computer program product and computer system corresponding to the method are additionally disclosed.

Additionally disclosed herein, a computer implemented method for executing writes with respect to a data storage system includes receiving a request to execute a write operation with respect to data stored on one or more storage devices, identifying one or more block addresses corresponding to a distinguished replica and a labeled replica corresponding to one or more data blocks affected by the write operation, setting one or more replication-pending bits with respect to the labeled replica, wherein the replication-pending bits indicate an incomplete write request, writing data to both the labeled replica and the distinguished replica corresponding to the data blocks altered by the write operation, and clearing the one or more replication-pending bits with respect to the labeled replica to indicate the completion of the write operation. A computer program product and computer system corresponding to the method are also disclosed.

Additionally disclosed herein, a computer implemented method for executing reads with respect to a data storage system includes receiving a read request with respect to one or more data blocks stored in the data storage device, identifying a distinguished replica and a labeled replica corresponding to the one or more data blocks indicated by the received read request, identifying a preferred replica with respect to the received read request and the one or more data block, determining whether a replication-pending bit is set with respect to the identified preferred replica, and responsive to determining that the replication-pending bit is set with respect to the preferred replica, executing the read request with respect to the corresponding distinguished replica.

DETAILED DESCRIPTION

Maintaining correctness in a replication system can be challenging in the face of failures. Incomplete or interrupted replicated writes can lead to replica inconsistency, wherein two or more replicas are not identical as intended, and are therefore not interchangeable as various components of the system may assume. Replica inconsistency can additionally lead to a loss of atomicity, due to the concurrent existence of part of a new update and partial old data. Embodiments of the present invention provide low latency storage for replicas; in particular, embodiments of the present invention may enable low latency for small, random writes, including flush/sync (e.g., storage class persistent memories (SCM), or NVMe). Embodiments of the present invention may additionally enable file metadata which holds replica addresses for all data blocks. Some embodiments of the present invention may additionally enable external synchronization with other writers and readers, and, in some of said embodiments, the readers may even run concurrently. The present invention may prove particularly applicable in scenarios where ensuring replica consistency limits write performance, such as in environments in which asymmetrical replication exists.

The present invention will now be described in detail with reference to the Figures. Implementation of embodiments of the invention may take a variety of forms, and exemplary implementation details are discussed subsequently with reference to the Figures.

Figure 1:
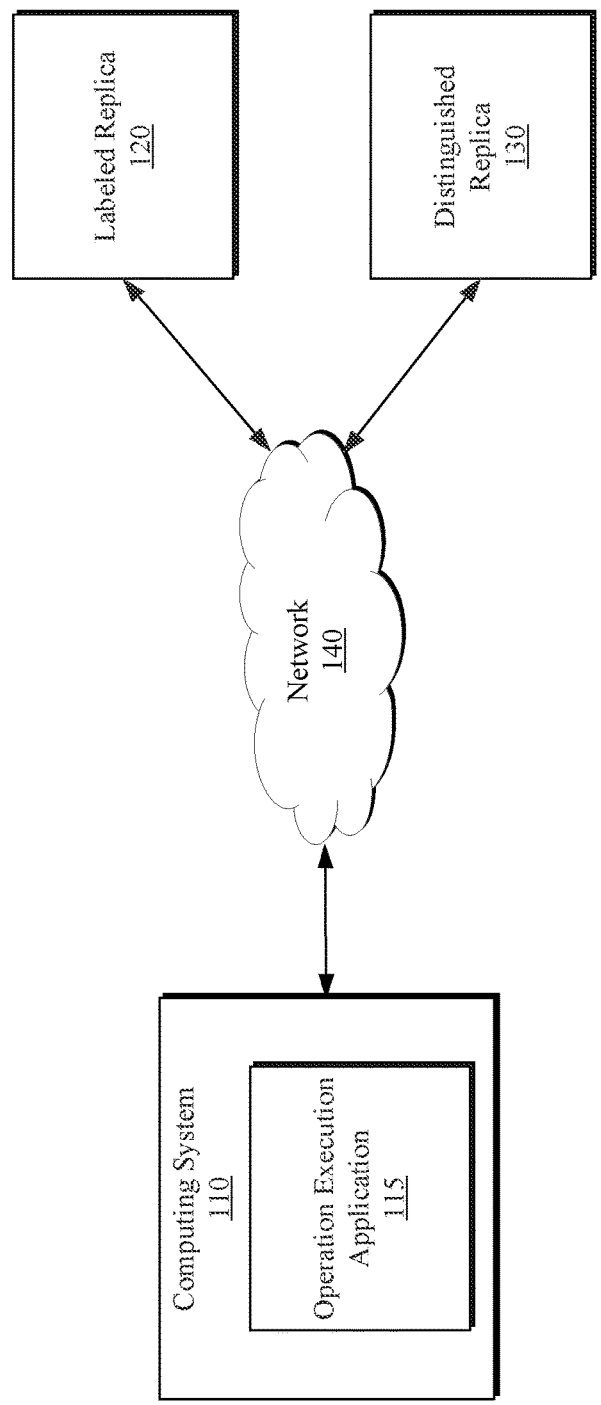
FIG. 1 is a block diagram depicting a replication system in accordance with at least one embodiment of the present invention.

FIG. 1 is a block diagram depicting a replication system 100 in accordance with at least one embodiment of the present invention. As depicted, replication system 100 includes computing system 110, labeled replica 120, distinguished replica 130, and network 140. Replication system 100 may reduce the resource cost of preventing inconsistent writes and providing atomic writes.

Computing system 110 can be a desktop computer, a laptop computer, a specialized computer server, or any other computer system known in the art. In some embodiments, computing system 110 represents computer systems utilizing clustered computers to act as a single pool of seamless resources. In general, computing system 110 is representative of any electronic device, or combination of electronic devices, capable of receiving and transmitting data, as described in greater detail with regard to FIG. 6. Computing system 110 may include internal and external hardware components, as depicted and described in further detail with respect to FIG. 6.

As depicted, computer system 110 includes operation execution application 115. Operation execution application 115 may be configured to execute any of the operation execution methods, read execution methods, and write execution methods as described herein. For example, operation execution application 115 may be configured to execute any of operation execution method 200, write execution method 300, read execution method 400, or write execution method 500 as described with respect to FIG. 2, FIG. 3, FIG. 4, and FIG. 5, respectively.

In general, replicas within a system can be categorized according to three types: labeled, distinguished, or preferred. Labeled replicas are stored on low-latency storage devices and include replication-pending bits. Distinguished replicas may be stored on devices with higher-latency than devices that correspond to labeled replicas, but may also be stored on more reliable devices. Preferred replicas are assigned with respect to an individual reader, and correspond to a replica type, either labeled or distinguished, which provides the best performance relative to said reader.

Labeled replica 120 corresponds to a replica stored on a low-latency storage device. In at least one embodiment, labeled replica 120 is a replica for which replication-pending bits are present. Distinguished replica 130 corresponds to a replica stored on a storage device with higher latency than the device labeled replica 120 is stored on. In at least one embodiment, distinguished replica 130 is a replica for which no replication-pending bits are present. In some embodiments, labeled replica 120 and distinguished replica 130 exist on separate devices within a single system.

Network 140 can be, for example, a local area network (LAN), a wide area network (WAN) such as the Internet, or a combination of the two, and include wired, wireless, or fiber optics connections. In general, network 140 can be any combination of connections and protocols that will support communications between computing system 110, labeled replica 120, and distinguished replica 130.

Figure 2:
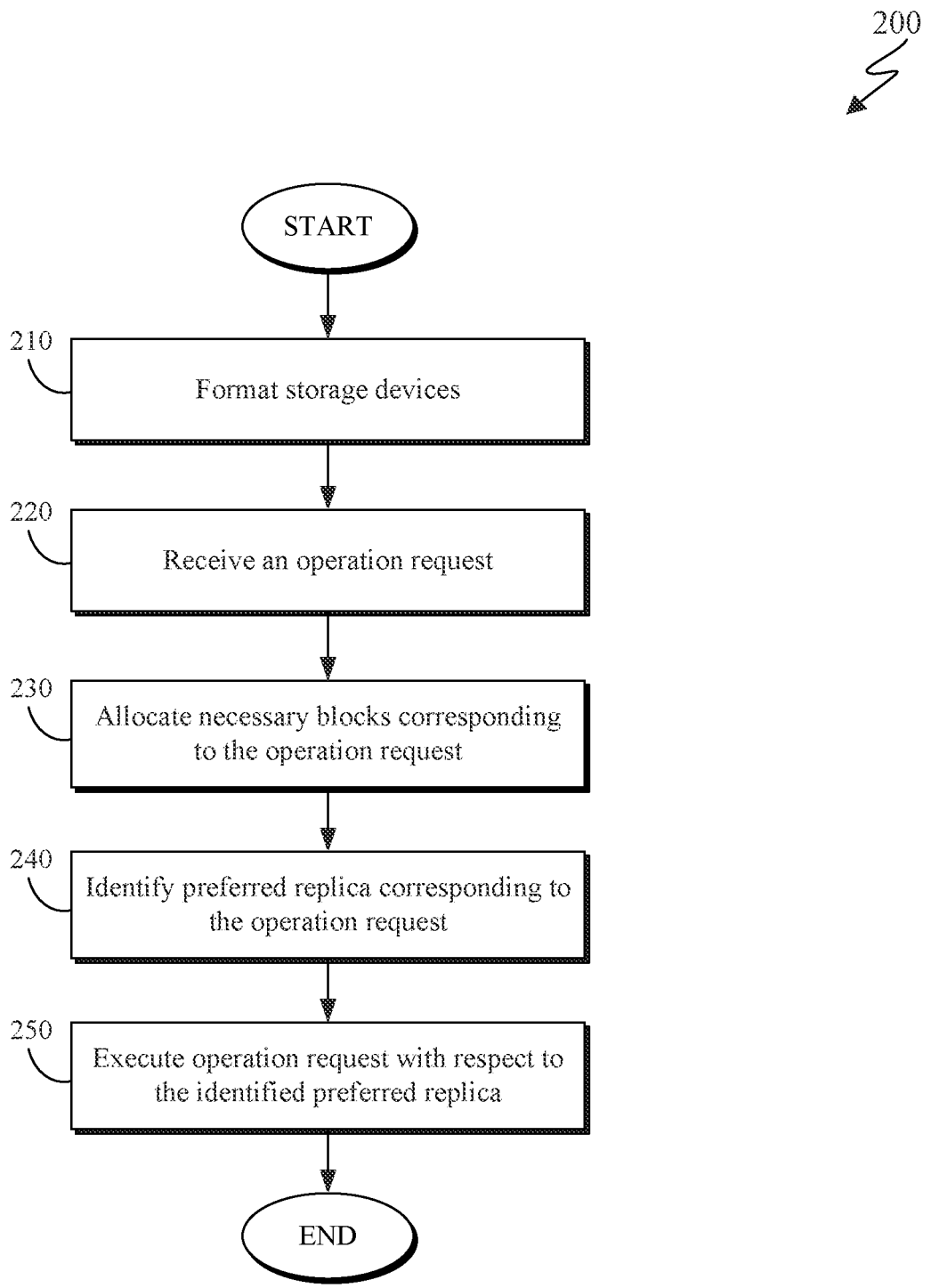
FIG. 2 is a flowchart depicting an operation execution method in accordance with at least one embodiment of the present invention.

FIG. 2 is a flowchart depicting an operation execution method 200 in accordance with at least one embodiment of the present invention. As depicted, the read/write execution method includes formatting (210) one or more storage devices, receiving (220) an operation request, allocating (230) necessary blocks corresponding to the operation request, identifying (240) a preferred replica corresponding to the operation request, and executing (250) the operation request with respect to the identified preferred replica.

Formatting (210) one or more storage devices may include preparing one or more data storage devices for initial use. The data storage devices may include, but are not limited to, hard disk drives, solid-state drives, floppy drives, or flash drives. In at least some embodiments, formatting (210) one or more storage devices includes the steps up low-level formatting, partitioning, and high-level formatting. Low-level formatting corresponds to the first part of the formatting process and includes basic medium preparation. In at least some embodiments, low-level formatting includes marking the surfaces of disks with markers indicating the start of a recording block (often called sector markers). Low-level formatting may be executed at the time of the physical manufacture of the disk. Partitioning corresponds to the second part of the formatting process, and includes dividing a disk into one or more regions and writing data structures to the disk to indicate the beginning and end of said regions. Partitioning may include checking for defective tracks or defective sectors, as well as making the storage device visible to an operating system. High-level formatting is the third step of the process, and includes creating a file system format within a disk partition or a logical volume. High-level formatting may include creating data structures used by an operating system to identify a logical drive or partition's contents.

Formatting (210) one or more storage devices may include identifying a replica, hereinafter referred to as a labeled replica, stored on a low-latency device. In at least some embodiments, the low-latency device is formatted to hold labeled replicas such that each block on the device holds either many replication-pending bits or a replica. The low-latency of the device may enable replicas to be have their replication pending bits modified with little overhead. In such embodiments, formatting (210) one or more storage devices includes identifying one or more replication-pending bits corresponding to the labeled replica. Replication-pending bits are bits which are utilized to indicate whether or not a write is in progress or otherwise incomplete with respect to the corresponding replica. In other words, when a write has been initiated, the replication-pending bits are set to indicate that an outstanding write exists with respect to the corresponding replica. Formatting (210) one or more storage devices may ultimately comprise identifying a storage device located on a low latency device, and assigning a replication-pending bit on said low latency device. In at least some embodiments, formatting (210) one or more storage devices includes assigning one replication-pending bit for each replica block.

Formatting (210) one or more storage devices may include identifying at least one distinguished replica stored on a device considered to be "reliable"; in other words, the reliable device may trade off performance factors such as latency for higher reliability characteristics such as durability, availability, atomicity, etc. (in other words, it makes updating replication-pending bits on such devices impractical). Formatting (210) one or more storage devices may include identifying one or more blocks holding distinguished replicas that are stored on reliable devices. In at least some embodiments, at least one distinguished replica corresponds to a replica assigned to a storage device that does not efficiently support replication-pending bits due to latency or other factors, such as a hard disk, a SAN-attached disk array, or other similar characteristics. The distinguished replica does not have a replication-pending bit, and may be used by all readers after an incomplete write to ensure consistency.

Receiving (220) an operation request may include receiving a request from an authorized user or device to execute an operation with respect to data stored on the one or more storage devices. In at least some embodiments, the operation request corresponds to a read request with respect to data stored on the one or more storage devices. A read operation acquires data from the one or more storage devices for processing. In other embodiments, the operation request corresponds to a write request with respect to data stored on the one or more storage devices. A write operation transfers data from a CPU to one of the one or more storage devices.

Allocating (230) necessary blocks corresponding to the operation request may include determining a number of blocks necessary to fulfill the received operation request. If the received operation request is a read request, it is not necessary to allocate any blocks, as additional data is not being transmitted to the one or more storage devices for storage. If the received operation request is a write request, however, allocating (230) necessary blocks corresponding to the operation request includes determining how many data blocks will be required to store the data being written with respect to the write request. Responsive to determining how many data blocks are required to complete the write request, allocating (230) necessary blocks includes designating or reserving at least that many blocks to be utilized with respect to the received write request. Blocks are allocated for each replica from devices formatted to hold labeled or distinguished replicas as needed.

Identifying (240) a preferred replica corresponding to the operation request may include determining whether the labeled replica or the distinguished replica is preferable for operation execution with respect to the received operation request. In at least some embodiments, identifying (240) a preferred replica includes analyzing a labeled replica and corresponding distinguished replica with respect to the received operation to identify a set of connection characteristics. The analyzed connection characteristics may include, for each replica, the replica's location, the location of the device initiating the operation request, the proximity of the replica to said device, connection strength between the replica and the initiating device, connection security between the replica and the initiating device, and so forth. In at least some embodiments, a preferred replica type may be indicated by protocols of the initiating device.

Executing (250) the operation request with respect to the identified preferred replica may include carrying out the operation with respect to the data stored via the identified preferred replica. With respect to a read request, executing (250) the operation request includes reading the data as stored with respect to the identified preferred replica. With respect to a write request, executing (250) the operation request includes writing data to the allocated blocks with respect to the identified preferred replica.

Figure 3:
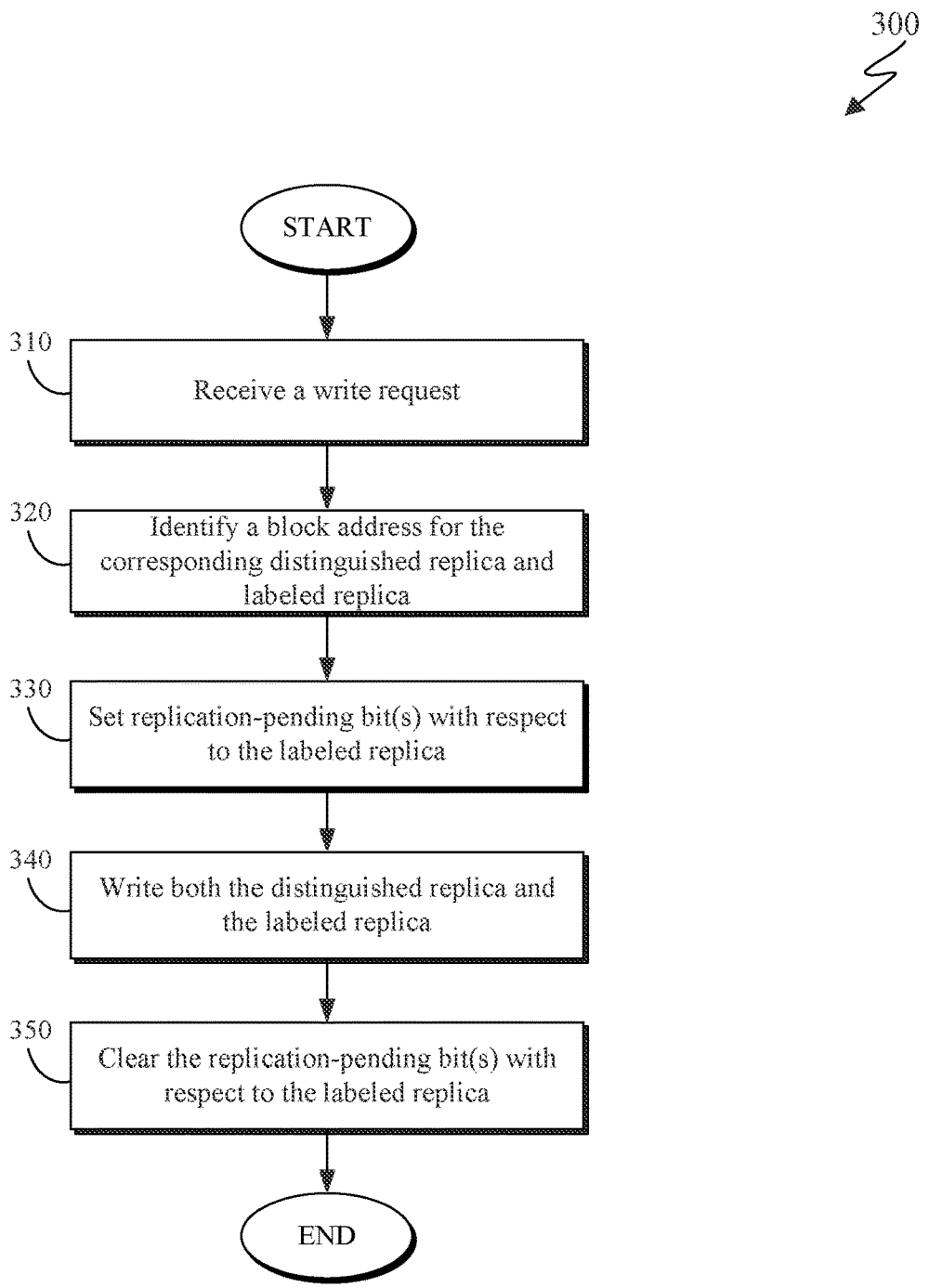
FIG. 3 is a flowchart depicting a write execution method in accordance with at least one embodiment of the present invention.

FIG. 3 is a flowchart depicting one example of a write execution method 300 for maintaining replica consistency, the method comprising receiving (310) a write request, identifying (320) a block address for both the distinguished replica and the labeled replica corresponding to the write request, setting (330) replication-pending bits with respect to the labeled replica, writing (340) both the distinguished replica and the labeled replica, and clearing (350) the replication-pending bit for the labeled replica. Write execution method 300 may enable maintaining replica consistency with respect to write operations.

Receiving (310) a write request may include receiving a request from an authorized user or device to execute a write operation with respect to data stored on one or more storage devices. In at least some embodiments, the received write operation includes a logical block, such as a file offset, to which the write operation will be applied.

Identifying (320) a block address for both the distinguished replica and the labeled replica corresponding to the write request may include allocating blocks for the write operation. In such embodiments, identifying (320) a block address for both the distinguished replica and the labeled replica additionally includes identifying a distinguished replica corresponding to the allocated blocks as well as a labeled replica corresponding to the allocated blocks. Identifying a distinguished replica and a labeled replica corresponding to the allocated blocks may include determining where each the distinguished replica and labeled replica are stored. In some embodiments, the blocks for the write operation may be allocated after the replica addresses are identified. A distinguished replica may be a replica corresponding to the blocks to be written which is stored on a device considered to be "reliable" according to any number of metrics of choice. The reliable device may trade off performance factors such as latency for higher reliability characteristics such as durability, availability, atomicity, etc. A labeled replica may be a replica corresponding to the allocated blocks to be written which is stored on a low-latency device, and which comprises one or more replication-pending bits.

Modifying (330) replication-pending bits with respect to the labeled replica may include setting the replication-pending bits to a set position to indicate that a write operation has been initiated with respect to the labeled replica. It should be appreciated that, while with respect to the described embodiments of the present invention, the "set" position of a replication-pending bit indicates an outstanding write request, in additional embodiments the inverse may be true; that is, the "clear" position of a replication-pending may be used to indicate an outstanding write request with respect to the labeled replica. For the sake of clarity, when used herein, the set position of the replication-pending bits indicates the presence of an outstanding write request, but it must be appreciated that the inverse is also applicable. In at least some embodiments, modifying (330) replication-pending bits with respect to the labeled replica includes using a mechanism similar to that which is used to update labeled replicas, which is referred to herein as "set/clear" or "write", respectively. Both functions send a new value to the storage device, and in some embodiments, confirming that the new value is persistent requires an explicit flush function. In other embodiments, a write to a storage device may be persistent as soon as it is completed, and a flush function is not additionally necessary. With respect to each write function described herein, a flush may be explicitly executed in some embodiments to ensure write completion in some embodiments, while in others the write may be persistent as soon as it is completed, rendering the flush unnecessary.

Writing (340) both the distinguished replica and the labeled replica may include executing the requested write operation with respect to both the distinguished replica and the labeled replica. In some embodiments, the distinguished replica and the labeled replica are written simultaneously; in other embodiments, the distinguished replica and the labeled replica are written one after the other. Notably, the order of the writing of the replicas themselves is trivial, as long as all the pertinent replicas are written before the replication-pending bit(s) are cleared.

Clearing (350) the replication-pending bit for the labeled replica may include setting the replication-pending bit for the labeled replica to the clear position. The clear state of the replication-pending bit indicates that a write request is no longer outstanding with respect to the labeled replica.

Figure 4:
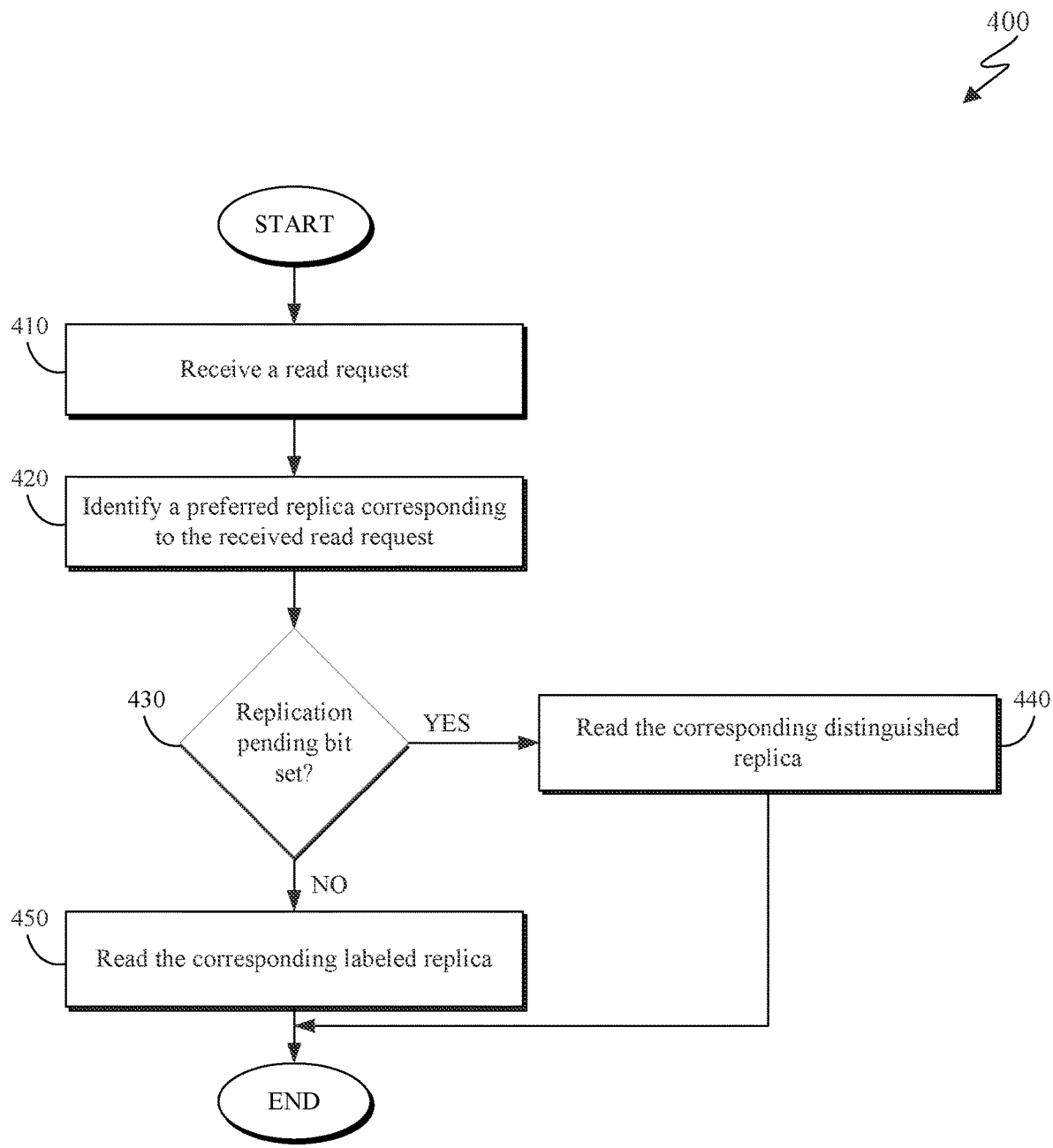
FIG. 4 is a flowchart depicting a read execution method in accordance with at least one embodiment of the present invention.

FIG. 4 is a flowchart depicting a read execution method 400 in accordance with at least one embodiment of the present invention. As depicted, read execution method 400 includes receiving (410) a read request, identifying (420) a preferred replica with respect to the received read request, determining (430) whether the replication-pending bit is set with respect to the preferred replica, reading (440) the distinguished replica, and reading (450) the labeled replica. Read execution method 400 ensures correctness with respect to replica consistency or write atomicity by returning correct data even when writes may have been interrupted.

Receiving (410) a read request may include receiving a request from an authorized user or device to execute a read operation with respect to data stored on one or more storage devices. In at least some embodiments, the received read operation includes a logical block, such as a file offset, with respect to which the read request will be executed.

Identifying (420) a preferred replica with respect to the received read request may include determining whether the labeled replica or the distinguished replica is preferable for operation execution with respect to the received read request. In at least some embodiments, identifying (420) a preferred replica includes analyzing a labeled replica and corresponding distinguished replica with respect to the received read request to identify a set of connection characteristics. The analyzed connection characteristics may include, for each replica, the replica's location, the location of the device initiating the read request, the proximity of the replica to said device, connection strength between the replica and the initiating device, connection security between the replica and the initiating device, and so forth. In at least some embodiments, a preferred replica type may be indicated by protocols of the initiating device.

Determining (430) whether the replication-pending bit is set with respect to the preferred replica may include determining whether the preferred replica has a replication-pending bit, and is therefore a labeled replica. If the preferred replica has no replication-pending bit, or the replication-pending bit is set (430, yes branch), the method continues by reading (440) the distinguished replica. If the preferred replica has a replication-pending bit that is not set (aka cleared) (430, no branch), the method continues by reading (450) the labeled replica.

Reading (440) the distinguished replica may include reading the indicated data from the distinguished replica according to the read request. Similarly, reading (450) the labeled replica may include reading the indicated data from the labeled replica according to the read request.

Figure 5:
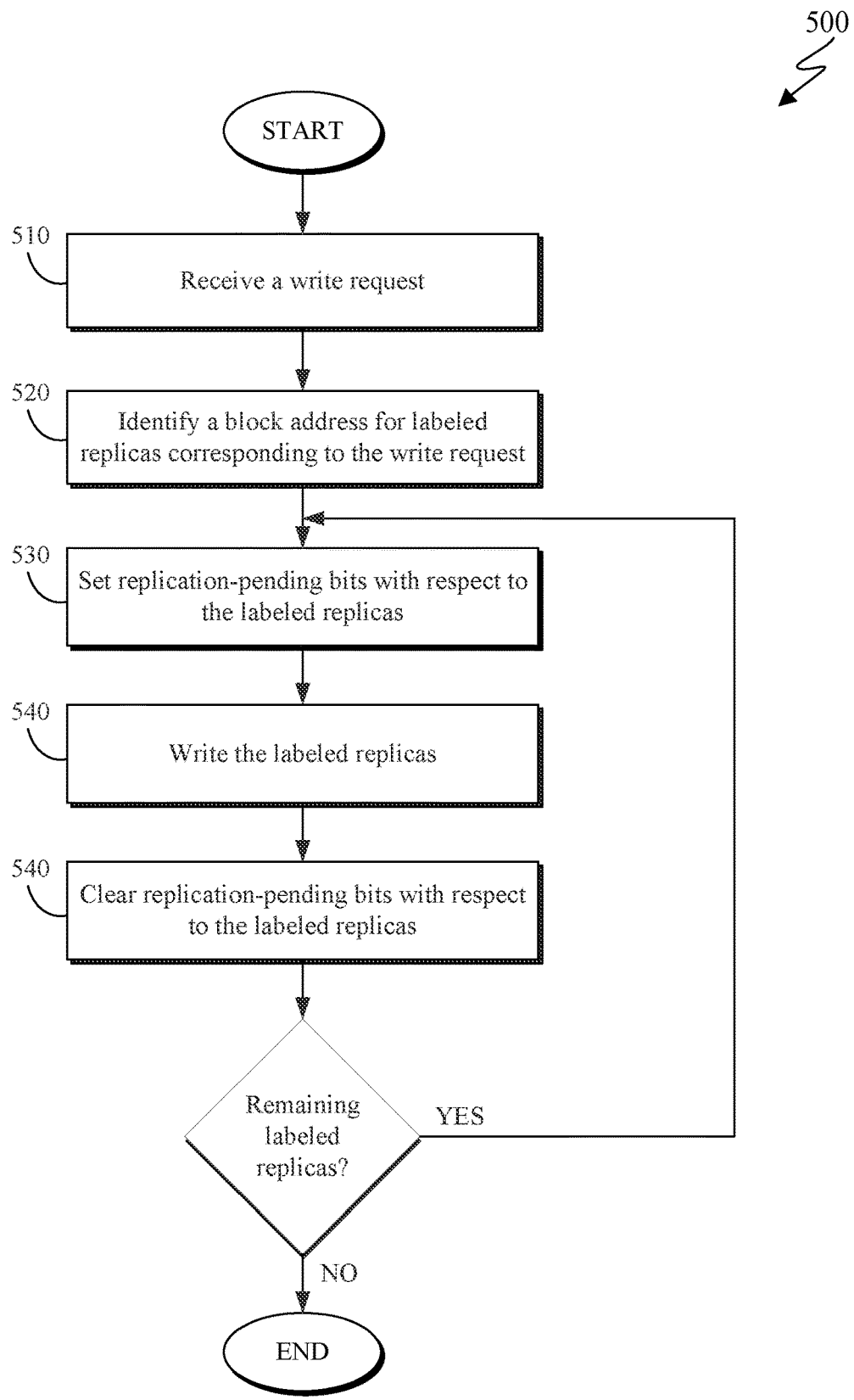
FIG. 5 is a flowchart depicting a write execution method in accordance with at least one embodiment of the present invention.

FIG. 5 depicts a write execution method 500 in accordance with at least one embodiment of the present invention. As depicted, write execution method 500 includes receiving (510) a write request, identifying (520) a logical block corresponding to the write request, setting (530) replication-pending bits with respect to the one or more labeled replicas, writing (540) the labeled replica, and determining (550) whether there are any remaining labeled replicas to be written. The method as described enables atomicity to be maintained with respect to the data storage system on which it is executed.

Receiving (510) a write request may include receiving a request from an authorized user or device to execute a write operation with respect to data stored on one or more storage devices. In at least some embodiments, the received write operation includes a logical block, such as a file offset, with respect to which the write request will be executed.

Identifying (520) a block address for one or more labeled replicas corresponding to the write request may include allocating blocks for the write operation. In such embodiments, identifying (520) a block address for one or more labeled replicas additionally includes determining that all replicas corresponding to the write request are labeled replicas. A labeled replica may be a replica which is stored on a low-latency device, and which comprises one or more corresponding replication-pending bits.

Setting (530) replication-pending bits with respect to one of the one or more labeled replicas may include setting the replication-pending bits to a set position to indicate that a write operation has been initiated with respect to the labeled replica. It should be appreciated that, while with respect to the described embodiments of the present invention, the "set" position of a replication-pending bit indicates an outstanding write request, in additional embodiments the inverse may be true; that is, the "clear" position of a replication-pending may be used to indicate an outstanding write request with respect to the labeled replica. For the sake of clarity, when used herein, the set position of the replication-pending bits indicates the presence of an outstanding write request, but it must be appreciated that the inverse is also applicable.

Writing (540) the labeled replica may include executing the requested write operation with respect to the labeled replica for which the replication-pending bits have been set. Once the write is complete with respect to the labeled replica, the method continues by clearing (550) the replication-pending bits. In at least some embodiments, before the replication-pending bits are cleared, the method executes a flush with respect to the write operation to verify that the write operation has indeed been executed as intended. In other words, in certain embodiments the results of the write operation are verified before the replication-pending bits are cleared.

Determining (550) whether there are any remaining labeled replicas to be written may include determining whether any additional labeled replicas correspond to the data blocks affected by the write operation. If any labeled replicas remain to be written (550, yes branch), the method continues by returning to setting (530) replication-pending bits with respect to one of the one or more labeled replicas, at which point the replication-pending bits of a different labeled replica are set. If no labeled replicas remain to be written (550, no branch), the method concludes.

With respect to the above described methods, any number of the writes (up to all of the writes except for one) may be executed in parallel for the sake of efficiency. The methods in some cases enable atomic writes; instead of writing each replica sequentially, the writes may be written in two groups, with at least one replica in each. Within each group, the replication-pending bits may be set in parallel, and the replicas may consequently be written in parallel, and then the replication-pending bits may be cleared in parallel. In some embodiments, a success indication may be returned if some replicas were written successfully and all other replication-pending bits are set. In other words, in such embodiments, a successful condition has been achieved as long as for each replica, either a write was executed successfully or the replica's replication-pending bits have been set to indicate an incomplete write. Such an embodiment may be appropriate if failed replicas will return to service before a next write is executed. Various embodiments of the above described methods may additionally include repairing replicas asynchronously to speed up read responses. Repair may be needed to clear replication-pending bits that are set to return these labeled replicas to service for read operations. For any logical block with some such labeled replicas, repair involves reading the contents of any replica whose corresponding replication-pending bit is clear or equivalently a distinguished replica, if there is one, and writing the contents to those labeled replicas whose corresponding replication-pending bits are set, and ultimately clearing those bits upon success.

With respect to each of the above methods, notably those described with respect to FIG. 3, FIG. 4, and FIG. 5, it is assumed that the operation methods are executed after some level of initial formatting has been conducted. Notably, each of these methods occurs after a data storage system has been formatted such that one or more labeled replicas have been identified, wherein the one or more labeled replicas are stored on a low latency storage device. Additionally, at the formatting stage, one or more replication-pending bits are identified or allocated with respect to each of the labeled replicas. The formatting process may additionally include selecting one or more distinguished replicas, wherein the distinguished replicas correspond to replicas which are located on "reliable" devices as described above.

Figure 6:
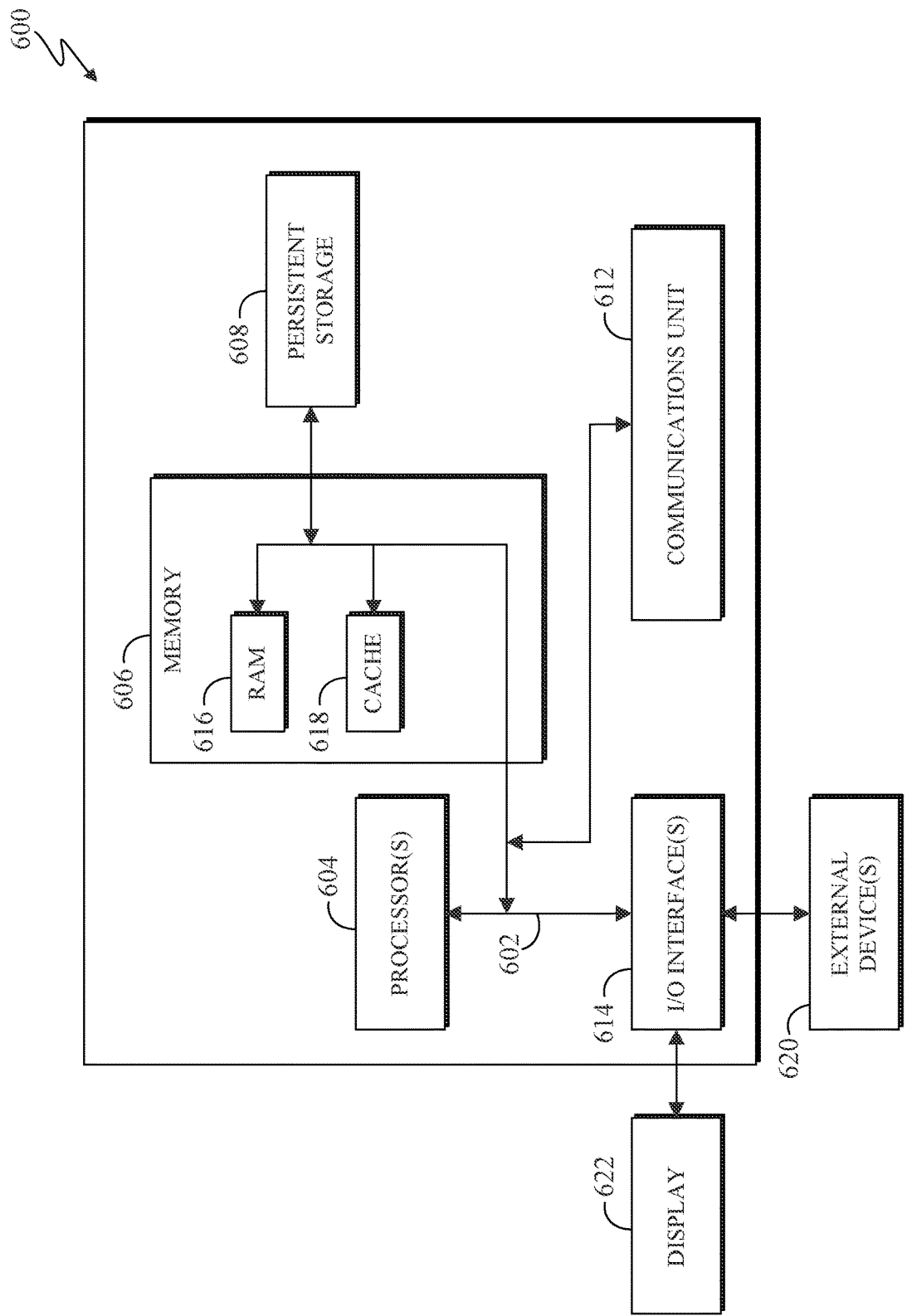
FIG. 6 is a block diagram of components of a computing system in accordance with an embodiment of the present invention.

FIG. 6 depicts a block diagram of components of computing system 110 in accordance with an illustrative embodiment of the present invention. It should be appreciated that FIG. 6 provides only an illustration of one implementation and does not imply any limitations with regard to the environments in which different embodiments may be implemented. Many modifications to the depicted environment may be made.

As depicted, the computer 600 includes communications fabric 602, which provides communications between computer processor(s) 604, memory 606, persistent storage 608, communications unit 612, and input/output (I/O) interface(s) 614. Communications fabric 602 can be implemented with any architecture designed for passing data and/or control information between processors (such as microprocessors, communications and network processors, etc.), system memory, peripheral devices, and any other hardware components within a system. For example, communications fabric 602 can be implemented with one or more buses.

Memory 606 and persistent storage 608 are computer-readable storage media. In this embodiment, memory 606 includes random access memory (RAM) 616 and cache memory 618. In general, memory 606 can include any suitable volatile or non-volatile computer-readable storage media.

One or more programs may be stored in persistent storage 608 for access and/or execution by one or more of the respective computer processors 604 via one or more memories of memory 606. In this embodiment, persistent storage 608 includes a magnetic hard disk drive. Alternatively, or in addition to a magnetic hard disk drive, persistent storage 608 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 608 may also be removable. For example, a removable hard drive may be used for persistent storage 608. Other examples include optical and magnetic disks, thumb drives, and smart cards that are inserted into a drive for transfer onto another computer-readable storage medium that is also part of persistent storage 608.

Communications unit 612, in these examples, provides for communications with other data processing systems or devices. In these examples, communications unit 612 includes one or more network interface cards. Communications unit 612 may provide communications through the use of either or both physical and wireless communications links.

I/O interface(s) 614 allows for input and output of data with other devices that may be connected to computer 600. For example, I/O interface 614 may provide a connection to external devices 620 such as a keyboard, keypad, a touch screen, and/or some other suitable input device. External devices 620 can also include portable computer-readable storage media such as, for example, thumb drives, portable optical or magnetic disks, and memory cards. Software and data used to practice embodiments of the present invention can be stored on such portable computer-readable storage media and can be loaded onto persistent storage 608 via I/O interface(s) 614. I/O interface(s) 614 also connect to a display 622.

Display 622 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer implemented for executing operation requests within a data storage system, the method comprising:
   formatting one or more storage devices and selecting one or more distinguished replicas;
   receiving an operation request with respect to a set of data blocks within the one or more formatted storage devices;
   identifying a preferred replica corresponding to the received operation request;
   confirming that replication-pending bits for the preferred replica are set, wherein the replication-pending bits indicate an incomplete write with respect to the preferred replica; and
   responsive to confirming that the replication-pending bits for the preferred replica are set, executing the received operation request with respect to the selected one or more distinguished replicas.

2. The computer implemented method of claim 1, wherein the one or more labeled replicas are located on one or more low-latency storage devices.

3. The computer implemented method of claim 1, wherein the one or more distinguished replicas are located on one or more reliable storage devices.

4. The computer implemented method of claim 1, wherein identifying a preferred replica with respect to the received operation request includes:
   analyzing one or more connection metrics between a device initiating the operation request and the labeled replica and the distinguished replica; and
   selecting either the labeled replica or the distinguished replica as the preferred replica with respect to the received operation request based, at least in part, on which replica's connection metrics meet or exceed protocols of the device initiating the operation request.

5. A computer program product for executing operation requests within a data storage system, the computer program product comprising:
    one or more computer readable storage media and program instructions stored on the one or more computer readable storage media, the program instructions comprising instructions to:
    format one or more storage devices and selecting one or more distinguished replicas;
    receive an operation request with respect to a set of data blocks within the one or more formatted storage devices;
    identify a preferred replica corresponding to the received operation request;
    confirm that replication-pending bits for the preferred replica are set, wherein the replication-pending bits indicate an incomplete write is incomplete with respect to the preferred replica; and
    responsive to confirming that the replication-pending bits for the preferred replica are set, execute the received operation request with respect to the selected one or more distinguished replicas.

6. The computer program product of claim 5, wherein the one or more labeled replicas are located on one or more low-latency storage devices.

7. The computer program product of claim 5, wherein the one or more distinguished replicas are located on one or more reliable storage devices.

8. The computer program product of claim 5, wherein instructions to identify a preferred replica with respect to the received operation request comprise instructions to:
    analyze one or more connection metrics between a device initiating the operation request and the labeled replica and the distinguished replica; and
    select either the labeled replica or the distinguished replica as the preferred replica with respect to the received operation request based, at least in part, on which replica's connection metrics meet or exceed protocols of the device initiating the operation request.

9. A computer implemented method for executing writes with respect to a data storage system, the method comprising:
    receiving a request to execute a write operation with respect to data stored on one or more storage devices;
    allocating one or more block addresses corresponding to a distinguished replica and one or more block addresses corresponding to a labeled replica corresponding to one or more data blocks altered by the write operation;
    setting one or more replication-pending bits with respect to the labeled replica, wherein the replication-pending bits indicate an incomplete write to the labeled replica;
    writing data to both the labeled replica and the distinguished replica corresponding to the data blocks altered by the write operation; and
    clearing the one or more replication-pending bits with respect to the labeled replica to indicate the completion of the write operation.

10. The computer implemented method of claim 9, wherein the labeled replica is located on a low-latency storage device.

11. The computer implemented method of claim 9, wherein the distinguished replica is located on a device characterized as reliable.

12. The computer implemented method of claim 9, wherein each labeled replica is written sequentially to ensure atomicity within the system.

13. The computer implemented method of claim 9, wherein the labeled replica and the distinguished replica are written in parallel.

14. A computer system for executing writes with respect to a data storage system, the computer system comprising:
    one or more computer processors;
    one or more computer-readable storage media;
    program instructions stored on the computer-readable storage media for execution by at least one of the one or more processors, the program instructions comprising instructions to:
    receive a request to execute a write operation with respect to data stored on one or more storage devices;
    identify one or more block addresses corresponding to a distinguished replica and one or more block addresses corresponding to a labeled replica corresponding to one or more data blocks altered by the write operation;
    set one or more replication-pending bits with respect to the labeled replica, wherein the replication-pending bits indicate an incomplete write to the labeled replica;
    write data to both the labeled replica and the distinguished replica corresponding to the data blocks altered by the write operation; and
    clear the one or more replication-pending bits with respect to the labeled replica to indicate the completion of the write operation.

15. The computer system of claim 14, wherein the labeled replica is located on a low-latency storage device.

16. The computer system of claim 14, wherein the distinguished replica is located on a device characterized as reliable.

17. The computer system of claim 14, wherein each labeled replica is written separately to ensure atomicity within the system.

18. The computer system of claim 14, further comprising instructions to disable one or more damaged replicas.

19. A computer implemented method for executing a read operation with respect to a data storage system, the method comprising:
    receiving a read request with respect to one or more data blocks stored in the data storage device;
    identifying a distinguished replica and a labeled replica corresponding to the one or more data blocks indicated by the received read request;
    identifying a preferred replica with respect to the received read request and the one or more data blocks;
    confirming that replication-pending bits for the preferred replica are set, wherein the replication-pending bits indicate an incomplete write with respect to the preferred replica; and
    responsive to confirming that the replication-pending bit is set with respect to the preferred replica, executing the read request with respect to the selected one or more distinguished replicas.

20. The computer implemented method of claim 19, further comprising disabling one or more damaged replicas.

21. The computer implemented method of claim 19, wherein identifying a preferred replica with respect to the received read request includes:
    analyze one or more connection metrics between a device initiating the operation request and the labeled replica and the distinguished replica; and
    select either the labeled replica or the distinguished replica as the preferred replica with respect to the received operation request based, at least in part, on which replica's connection metrics meet or exceed protocols of the device initiating the operation request.

22. The computer implemented method of claim 19, further comprising:

responsive to determining that the replication-pending bit is set with respect to the preferred replica, executing the read request with respect to another corresponding labeled replica.

\* \* \* \* \*